US005178001A

United States Patent [19]

Ikeuchi et al.

[11] Patent Number: 5,178,001

[45] Date of Patent: Jan. 12, 1993

[54] IGNITION APPARATUS FOR AN INTERNAL COMBUSTION ENGINE

[75] Inventors: Masayuki Ikeuchi; Shigemi Murata, both of Himeji, Japan

[73] Assignee: Mitsubishi Denki Kabushiki Kaisha, Tokyo, Japan

[21] Appl. No.: 765,298

[22] Filed: Sep. 25, 1991

[30] Foreign Application Priority Data

Oct. 2, 1990 [JP] Japan .......... 2-263045
Oct. 2, 1990 [JP] Japan .......... 2-263049

[51] Int. Cl.[5] .......... G01M 15/00

[52] U.S. Cl. .......... 73/117.3; 123/414; 324/459

[58] Field of Search .......... 73/117.3; 123/414, 419, 123/436; 324/378, 459

[56] References Cited

U.S. PATENT DOCUMENTS 4,262,524 4/1981 Russo et al. .......... 73/116 X
4,762,106 8/1988 Blauhut .......... 123/425

*Primary Examiner*—Jerry W. Myracle

*Attorney, Agent, or Firm*—Sughrue, Mion, Zinn, Macpeak and Seas

[57] ABSTRACT

An ignition apparatus for an internal combustion engine can prevent malfunctions due to noise induced by a high ignition voltage which is developed by an ignition coil upon ignition. Generation of a misfiring detection signal can also be prevented during fuel supply cut-off operations. To these ends, in one aspect, and ignition apparatus includes: a controller for controlling the ignition of a cylinder of the engine in synchronism with the rotation thereof; a detector connected to a spark plug and an ignition coil for detecting an ion current which is generated between the electrodes of the spark plug upon combustion of an air/fuel mixture in the cylinder; and mask a for masking the output signal of the detector in response to discharge of the spark plug. In another aspect, an ignition apparatus includes: a controller for controlling the ignition of and the fuel supply to a cylinder of the engine in synchronism with the rotation thereof; a detector for detecting misfiring in the cylinder; and mask a for masking the output signal of the detector when the fuel supply to the cylinder is cut off.

14 Claims, 7 Drawing Sheets

FUEL CUT-OFF
MISFIRING DUE TO FUEL CUT-OFF
RESET
ADDITIONAL MASK TIME δt
(1)
(2)
(3)
(4)
(5)
(A) (CLK)
(B)
(C2)
(D)
(E) (RESET)
(F)
(G)
(H) (MASK)
(I)
t1
t2
t3t4
t5
t6t7
t8
t9
t10
t11

IGNITION APPARATUS FOR AN INTERNAL COMBUSTION ENGINE

BACKGROUND OF THE INVENTION

The present invention relates to an ignition apparatus for an internal combustion engine, and more particularly, it relates to an ignition apparatus which is capable of preventing malfunctions due to noise induced by a high voltage generated upon discharge of a spark plug. The invention also relates to an ignition apparatus which is able to discriminate intentional or controlled misfiring due, for example, to intentional cut-off of the fuel supply from other misfiring due to malfunctions.

FIG. 5 shows a typical example of a known ignition apparatus for an internal combustion engine. In this figure, the apparatus illustrated includes a controller 1 for controlling the fuel injection and the ignition of an internal combustion engine in synchronism with the rotation thereof, a power transistor 2, an ignition coil 3, a reverse-current checking diode 4, and a spark plug 5. The ignition coil 3 has a primary winding connected to ground through a collector-emitter connection of the power transistor 2, and a secondary winding connected to one electrode of the spark plug 5 through the reverse-current checking diode 4. The spark plug 5 has the other electrode connected to a negative electrode of a DC power source 8 through an ion current sensing diode 6 and a resistor 7. A serial connection comprising a capacitor 9 and a resistor 10 is connected in parallel with a serial connection comprising the resistor 7 and the DC power source 8. A comparator 11 has a pair of first and second input terminals, the first input terminal being connected to a junction between the capacitor 9 and the resistor 10, the second input terminal being connected to a reference voltage source. When a voltage D imposed on the first input terminal, as shown at (D) in FIG. 6, exceeds the reference voltage at the second input terminal, the comparator 11 generates an output signal E, as shown at (E) in FIG. 6, which is input as a reset signal to a pair of first and second counters 12, 13 which together constitute a binary counter. In this regard, the elements 6 thorough 11 together constitute an ion current detector for detecting an ion current generated between the electrodes of the spark plug 5 upon combustion of an air/fuel mixture in the cylinder 15. The first counter 12 is alternately turned on and off or turned into a high level and a low level by a clock pulse supplied thereto from a signal generator 19 through a comparator 20, which will be described in detail later, and it is reset by a reset signal E from the comparator 11, so that it generates an output signal, as shown at (F) in FIG. 6. The second counter 13 generates a high output when a clock pulse A is input to the first counter 12 during the time the first counter 12 is at a high level, and it is reset by a reset signal E from the comparator 11.

The controller 1 supplies a fuel injection control signal to a fuel injector 14 which injects, based thereon, an appropriate amount of fuel into an intake pipe IP of the engine. The engine includes a cylinder 15 in which a piston 16 is received for reciprocating movement. The piston 16 is connected with a crankshaft 18 through a piston rod 17.

A signal generator 19 generates a control signal in synchronism with the rotation of the crankshaft 18. The control signal contains a series of pulses occurring at predetermined intervals. The control signal from the signal generator 19 is fed to the controller 1 as well as the first counter 12 through the comparator 20 as a clock signal.

The operation of the above-mentioned known ignition apparatus will now be described in detail with reference to a timing chart FIG. 6 which shows the waveforms of signals at various portions of the ignition apparatus.

Under the normal operating condition of the engine in which normal combustion takes place in the cylinder 15 without misfiring, in synchronism with an output or clock pulse A from the signal generator 19, which is shown at (A) in FIG. 6, the controller 1 generates a fuel injection control signal B, as shown at (B) in FIG. 6, which is fed to the injector 14. At the same time, the controller 1 turns the power transistor 2 off so that a positive voltage is developed across the primary winding of the ignition coil 3, as shown at ($C_1$) in FIG. 6, and a negative voltage is developed across the secondary winding of the ignition coil 3, as shown in at ($C_2$) in FIG. 6, thereby causing the spark plug 5 to generate a spark. Upon sparking of the spark plug 5, an air/fuel mixture in the cylinder 15 is fired. As a result, between the electrodes of the spark plug 5 there is generated an ion current I which is supplied to the first input terminal of the comparator 11 through the diode 6 and the capacitor 9. The waveform of the ion current I thus supplied to the comparator 11 contains a noise component N, as illustrated at (D) in FIG. 6, which results from a high voltage induced across the secondary winding of the ignition coil 3 when the power transistor 2 is turned off. When the comparator 11 receives the ion current I containing the noise component N at the first input terminal thereof, it generates an output signal in the form of a reset signal E, as shown at (E) in FIG. 6. In other words, within one period of the clock signal A from the signal generator 19 (i.e., a period between successive clock pulses), there is generated two types of reset signals, one being due to noise and the other due to the ion current. As a consequence, the first counter 12, which is alternatively turned on and off by a clock signal pulse and is reset by a reset signal pulse, is always reset by a reset signal due to noise, so that it generates an output signal which rises at the rising edge of a clock pulse A and falls at the rising edge of a noise-induced reset pulse, as shown at (F) in FIG. 6. Accordingly, the second counter 13 generates no output or a low level output at all times, as shown at (G) in FIG. 6.

In this manner, the first and second counters 12, 13 of the known ignition apparatus operate irrespective of the presence and absence of an ion current, so when misfiring takes place at a time between time t2 corresponding to the rising edge of a clock pulse and time t3 corresponding to the rising edge of the following clock pulse, it is impossible to detect this misfiring.

In addition, if the controller 1 intentionally cuts off the fuel supply to the cylinder 15 for saving fuel during rapid decelerations for example, the second counter 13 generates a high level output indicative of misfiring in the cylinder 15. That is, as illustrated in FIG. 7, if the fuel supply to the cylinder 15 is to be cut off at a time between $t_3$ and $t_4$ for example, the controller 1 stops generation of a fuel injection control signal, as shown at (B) in FIG. 7, so there is no ion current generated, as shown at (D) in FIG. 7, and hence the comparator 11 generates no reset signal, as shown at (E) in FIG. 7. As a result, as illustrated at (F) in FIG. 7, the output of the first counter 12 rises at time $t_3$, at which a clock pulse A is input thereto from the comparator 20, and falls at time $t_4$, at which the following clock pulse A is input, so that the second counter 13 generates a high level output at time $t_4$ and is then reset by a reset pulse E from the comparator 11 at time $t_6$, as shown at (G) in FIG. 7. That is, the second counter 13 generates a misfiring detection signal during fuel supply cut-off periods, which is undesirable.

SUMMARY OF THE INVENTION

Accordingly, the present invention is aimed at overcoming the above problems encountered with the aforementioned known ignition apparatus.

An object of the invention is to provide a novel and improved ignition apparatus for an internal combustion engine in which malfunctions due to noise induced by a high ignition voltage developed upon ignition can be avoided in a reliable manner.

Another object of the invention is to provide a novel and improved ignition apparatus for an internal combustion engine in which generation of a misfiring detection signal can be prevented during fuel supply cut-off operations.

According to one aspect of the present invention, there is provided an ignition apparatus for an internal combustion engine having an ignition coil and a spark plug with electrodes. The apparatus comprising: a controller for controlling the ignition of a cylinder of the engine in synchronism with the rotation thereof; a detector connected to the spark plug and the ignition coil for detecting an ion current which is generated between the electrodes of the spark plug upon combustion of an air/fuel mixture in the cylinder; and mask means for masking the output signal of the detector in response to discharge of the spark plug.

The detector is an ion current detector which detects an ion current component generated by the combustion of the mixture due to the ion current and a noise component generated by the ignition coil upon ignition. The mask means is operable to mask the noise component alone contained in the output signal of the detector.

Preferably, the mask means comprises: a serial connection including a resistor and a capacitor serially connected to each other between the ignition coil and ground; a comparator having a first input terminal connected to a node between the resistor and the capacitor, a second input terminal on which a reference voltage is imposed, and an output terminal; and an AND gate having an inverted input terminal connected to the output terminal of the comparator and a non-inverted input terminal to which the output signal of the detector is input.

According to another aspect of the invention, there is provided an ignition apparatus for an internal combustion engine comprising: a controller for controlling the ignition of and the fuel supply to a cylinder of the engine in synchronism with the rotation thereof; a detector for detecting misfiring in the cylinder; and mask means for masking the output signal of the detector when the controller cuts off the fuel supply to the cylinder.

Preferably, the mask means comprises an AND gate having an inverted input terminal connected to receive a mask signal which is generated by the controller in response to cut-off of the fuel supply to the cylinder, the generation of the mask signal being stopped after the fuel supply to the cylinder restarts, and a non-inverted input terminal to which the output signal of the detector is input.

According to a further aspect of the invention, there is provided an ignition apparatus for an internal combustion engine having an ignition coil and a spark plug with electrodes, the apparatus comprising: a controller for controlling the ignition of and the fuel supply to a cylinder of the engine in synchronism with the rotation thereof; a misfiring detector for detecting misfiring in the cylinder, the misfiring detector including an ion current detector which is connected to the spark plug and the ignition coil for detecting an ion current which is generated between the electrodes of the spark plug upon combustion of an air/fuel mixture in the cylinder; and first mask means for masking the output signal of the ion current detector in response to discharge of the spark plug; and second mask means for masking the output signal of the misfiring detector when the controller cuts off the fuel supply to the cylinder.

The above and other objects, features and advantages of the invention will become more readily apparent from the following detailed description of a preferred embodiment of the invention taken in conjunction with the accompanying drawings.

DETAILED DESCRIPTION OF THE PREFERRED EMBODIMENTS

A few preferred embodiments of the invention will be described in detail while referring to the accompanying drawings.

Figure 1:
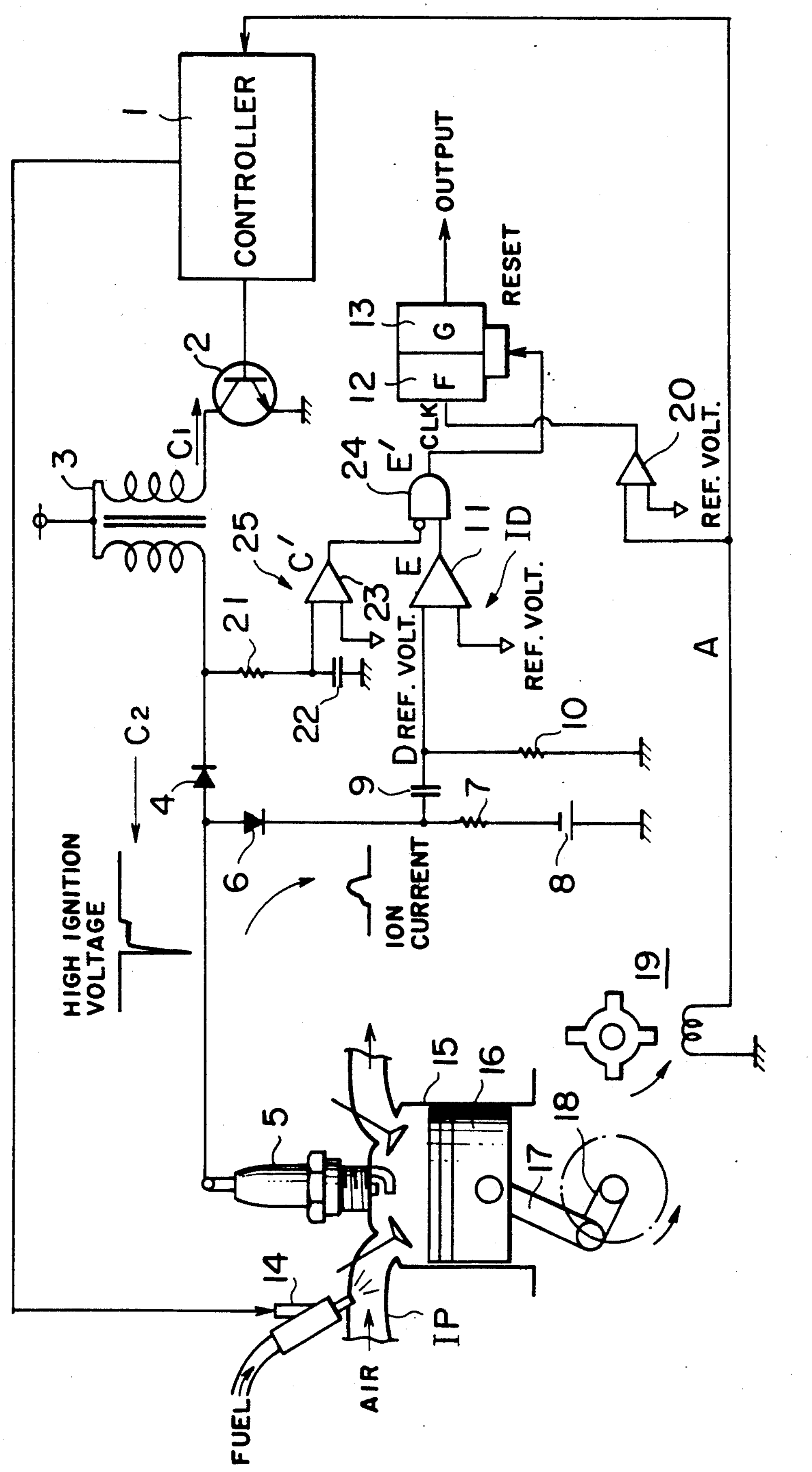
FIG. 1 is a schematic diagram showing the general arrangement of an ignition apparatus for an internal combustion engine according to the invention.
Figure 5:
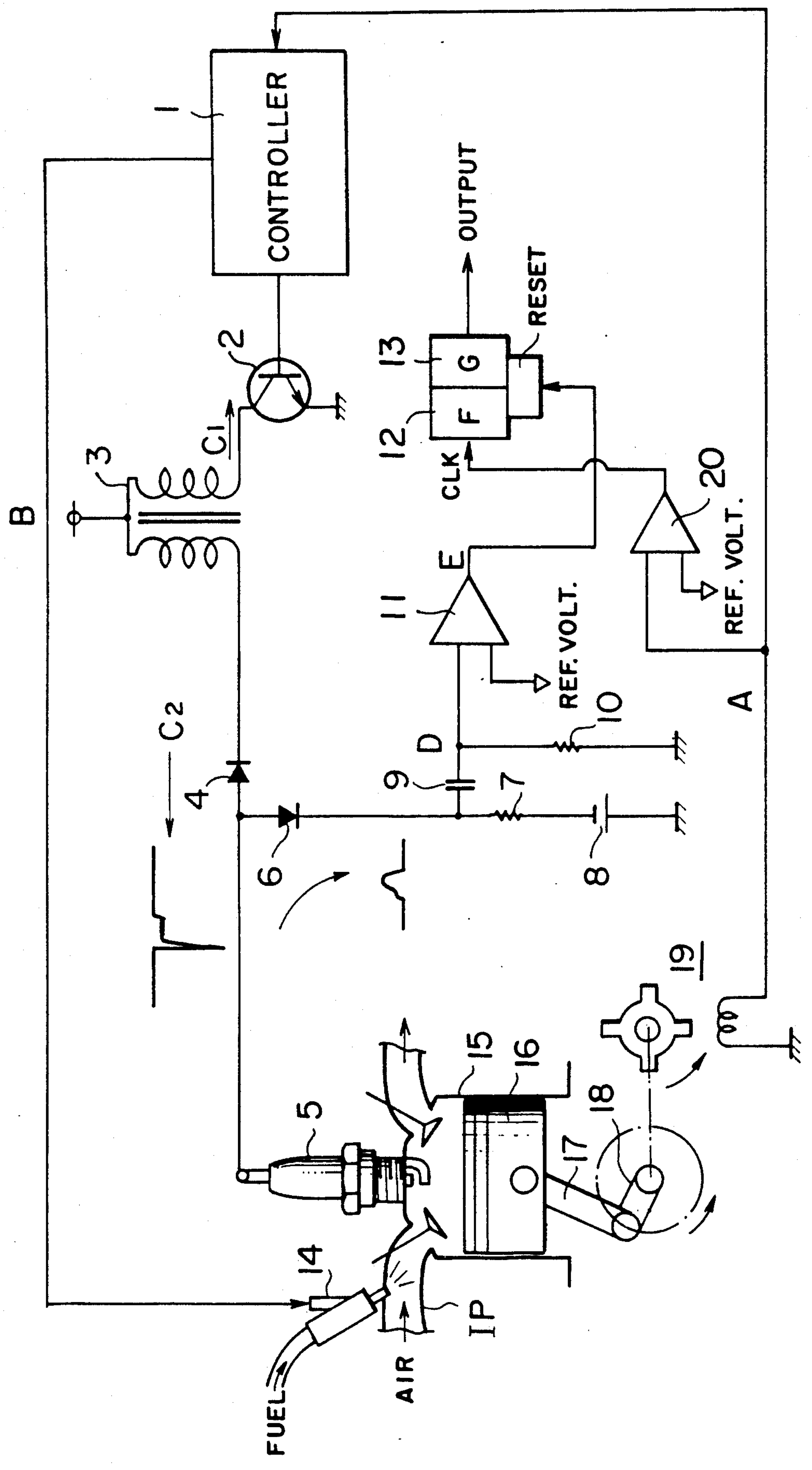
FIG. 5 is a view similar to FIG. 1, but showing a known ignition apparatus for an internal combustion engine.
Figure 6:
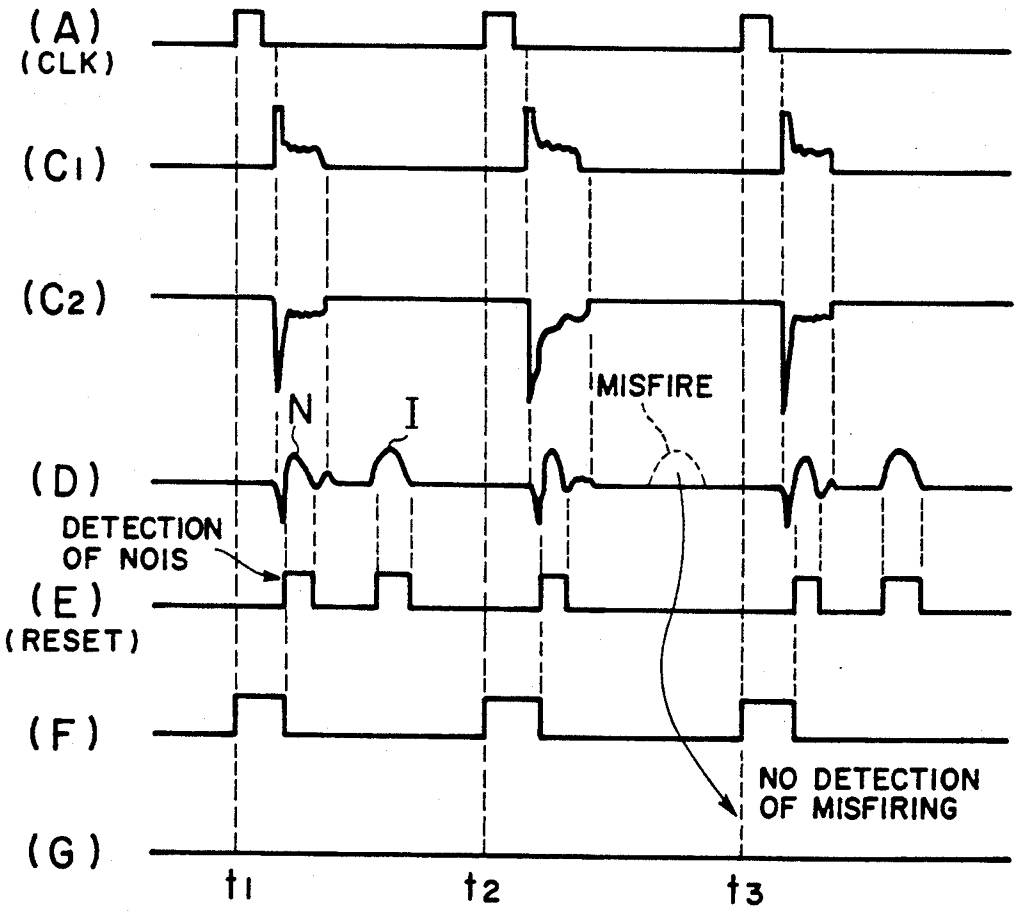
FIG. 6 is a view similar to FIG. 2, but with the known apparatus of FIG. 5 in the case of unintentional misfiring.
Figure 7:
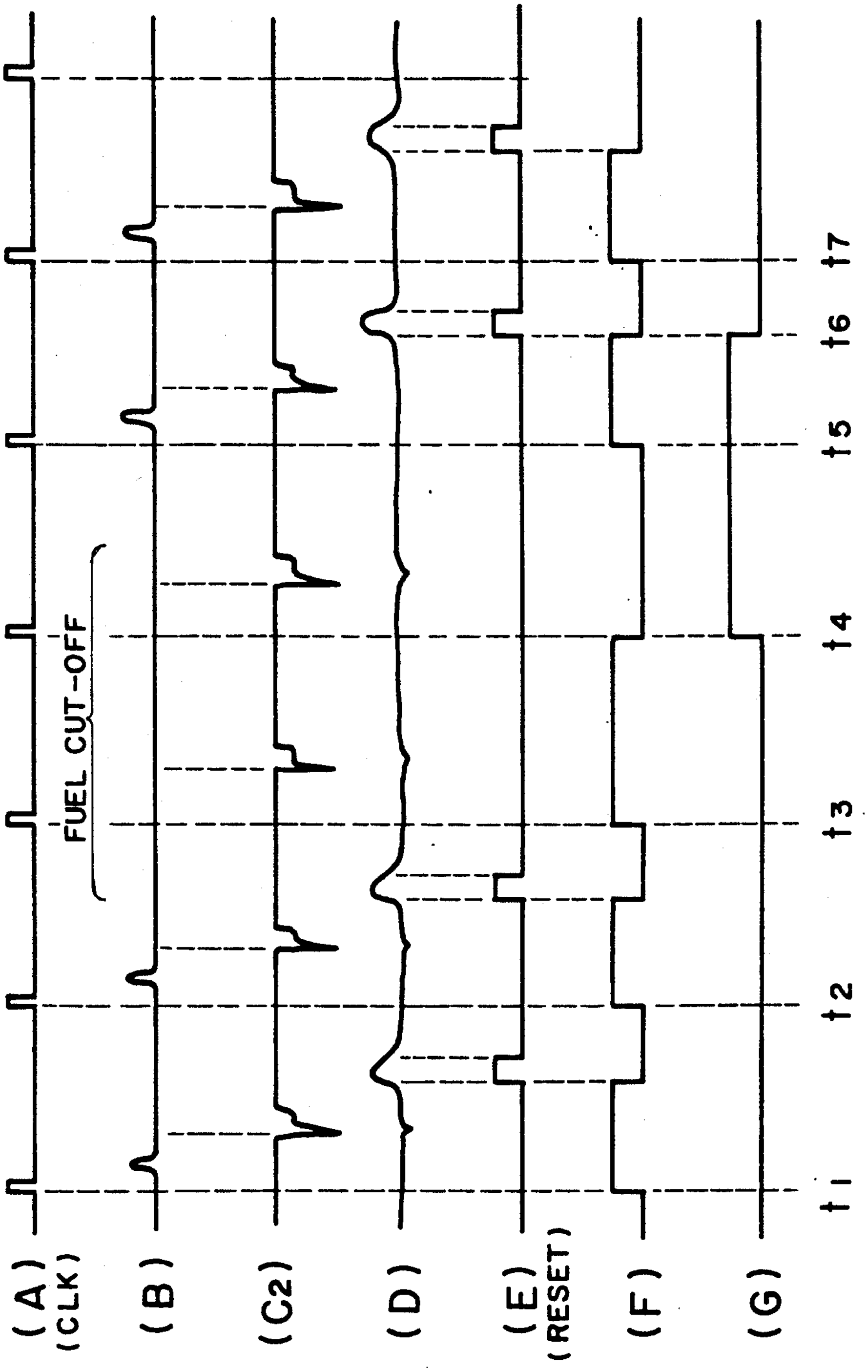
FIG. 7 is a view similar to FIG. 4, but with the known apparatus of FIG. 5 in the case of intentional or controlled misfiring due to cut-off of the fuel supply.

Referring first to FIG. 1, there is shown an ignition apparatus for an internal combustion engine constructed in accordance with a first embodiment of the invention, which can perform accurate detection of misfiring in a highly reliable manner while avoiding erroneous detection due to a high ignition voltage generated upon ignition. The apparatus illustrated is substantially similar in construction to the known ignition apparatus of FIG. 5 except for the provision of a mask means for masking the output signal of an ion current detector ID, which is constituted by elements 6 through 11, in response to discharge of a spark plug 5. Thus, the same elements of this embodiment as those of the known apparatus of FIG. 5 are identified by the same symbols as employed in FIG. 5.

The mask means, which is generally designated by reference numeral 25, includes a serial connection comprising a resistor 21 and a capacitor 22 which are serially connected to each other between the secondary winding of an ignition coil 3 and ground. A comparator 23 has a first input terminal connected to a node between the resistor 21 and the capacitor 22, a second input terminal connected to a reference voltage source, and an output terminal connected to a negative or inverted input terminal of an AND gate 24 which has a positive or non-inverted input terminal connected to an output terminal of a comparator 11. The AND gate 24 has an output terminal connected to a common reset terminal of a first and a second counter 12, 13. The construction of this embodiment other than the above is similar to that of the aforementioned known apparatus of FIG. 5.

The operation of this embodiment will now be described in detail while referring to the timing chart of FIG. 2. First, let us consider the case that the engine normally operates with normal combustion in the cylinder 15 taking place without misfiring. In the normal operating condition of the engine, in synchronism with an output or clock signal A from the signal generator 19, which is shown at (A) in FIG. 2, the control unit 1 generates a fuel injection control signal to the injector 14 and at the same time, it turns the power transistor 2 off so that a positive voltage $C_1$ is developed across the primary winding of the ignition coil 3, as shown at ($C_1$) in FIG. 2, and a negative voltage $C_2$ is developed across the secondary winding of the ignition coil 3, as shown in at ($C_2$) in FIG. 2, thereby causing the spark plug 5 to generate a spark. Upon discharge or sparking of the spark plug 5, an air/fuel mixture in the cylinder 15 is fired. As a result, between the electrodes of the spark plug 5 there is generated an ion current I which is supplied to the first input terminal of the comparator 11 through the diode 6 and the capacitor 9. In this connection, the ion current I thus input to the comparator 11 generally includes a noise component or pulse N due to a high voltage induced by the ignition coil 3 upon turn-off of the power transistor 2, as shown at (D) in FIG. 2. Thus, these two types of pulses including an ion current pulse I and a noise pulse N are input to the first input terminal of the comparator 11, which then generates an output signal E containing two types of pulses in one cycle of the clock signal A, one being due to the ion current and the other due to noise, as shown at (E) in FIG. 2.

Figure 2:
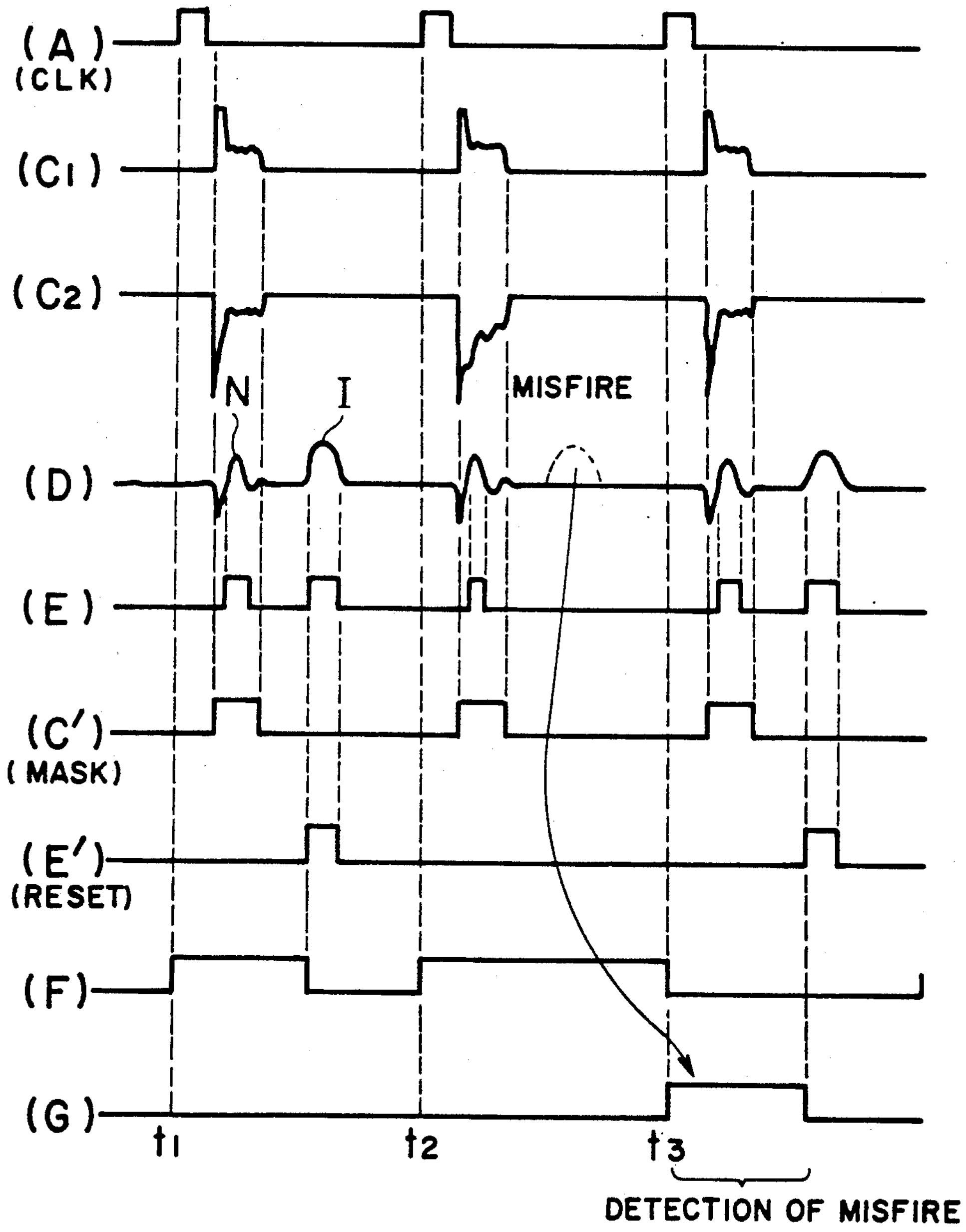
FIG. 2 is a timing chart showing the waveforms of signals at various portions of the ignition apparatus of FIG. 1.

On the other hand, the comparator 23 of the mask means 25 generates an output signal C′, as shown at (C′) in FIG. 2, in response to a high ignition voltage developed across the secondary winding of the ignition coil 3 when the power transistor 2 is turned off by the controller 1. The output signal C′ from the comparator 23 is input to the inverted input terminal of the AND gate 24, which also receives an output signal E from the comparator 11, as shown at (E) in FIG. 2, and performs logic processing to provide an output or reset signal E′, as shown at (E′) in FIG. 2. Thus, a noise-induced reset pulse contained in the output signal E of the comparator 11 is masked or disabled by the output signal C′ from the comparator 23, so that a reset pulse due to the ion current alone is taken out of the output signal E of the comparator 11 as a true reset signal, which is then input to the first counter 12. As a result, the first counter 12 produces an output signal which rises or becomes high at the rising edge of a clock pulse A and then falls or becomes low at the rising edge of a reset signal E′, as shown at (F) during the period between time $t_1$ and time $t_2$ in FIG. 2. In this case, the output level of the second counter 13 remains low, as shown at (G) in FIG. 2.

Now, let us consider the case that misfiring takes place during the period between time $t_2$ and time $t_3$ for example. In this case, no ion current is generated between the electrodes of the spark plug 5 upon discharge thereof, so the AND gate 24, of which the non-inverted input terminal is now at a low level, produces no output or reset pulse, as clearly shown at (E′) in FIG. 2. As a result, the output level of the first counter 12 is turned high by a clock pulse A from the comparator 20 generated at time $t_2$, and it is then reset at time $t_3$ by the following clock pulse A, as shown at (F) in FIG. 2. Accordingly, the second counter 13 generates an output signal G which rises at time $t_3$ and is then reset to fall by a reset pulse E′ due to an ion current, thus detecting misfiring in the cylinder 15.

Figure 3:
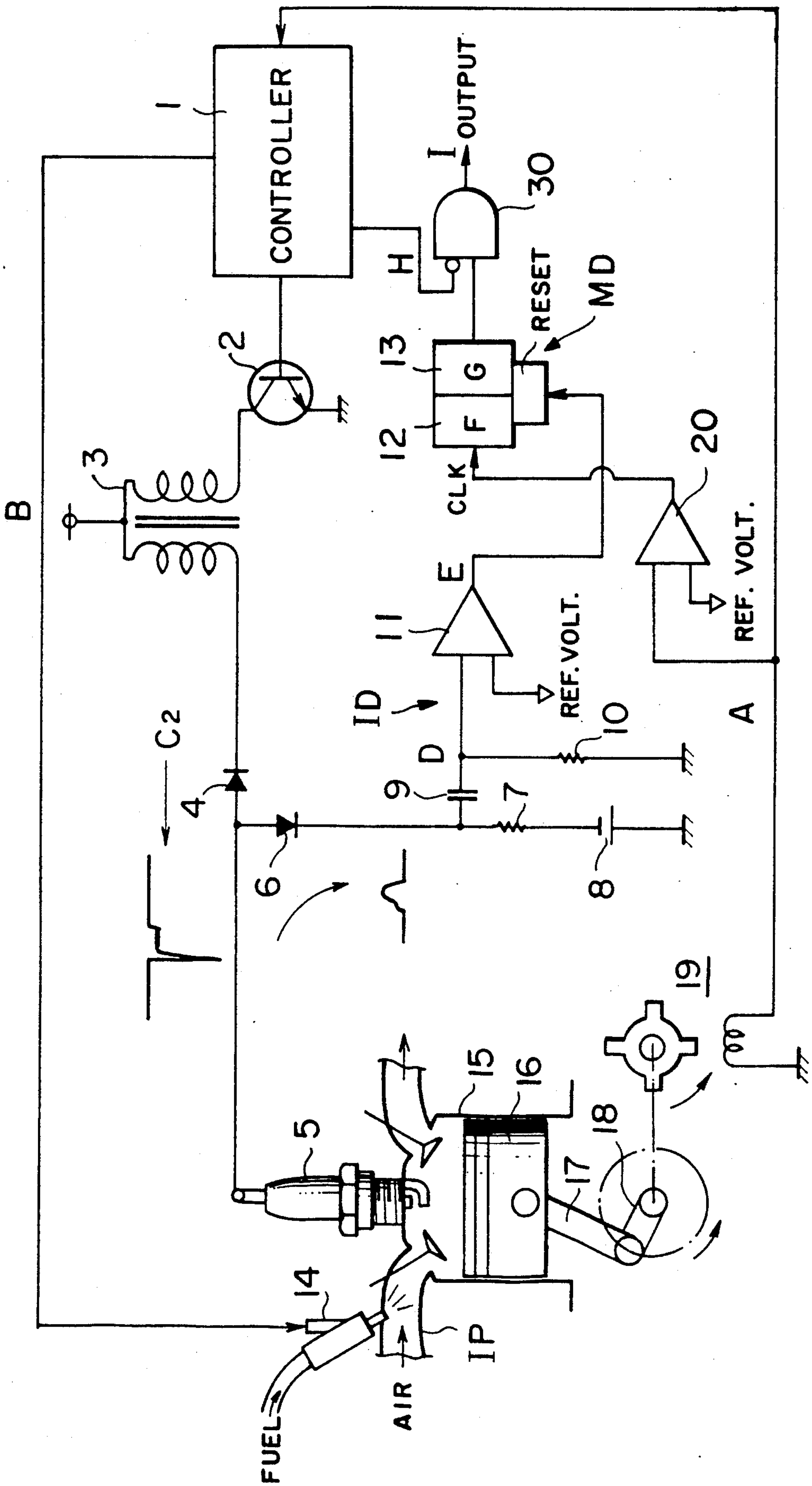
FIG. 3 is a view similar to FIG. 1, but showing another embodiment of the invention.

FIG. 3 illustrates a second embodiment of the invention which can prevent erroneous detection of intentional or controlled misfiring in a cylinder. To this end, a mask means 30 is provided which is connected to a controller 1 and a misfiring detector MD, which is constituted by an ion current detector ID and a counter means comprising a first and a second counter 12, 13, for masking the output signal of the misfiring detector MD when the fuel supply to a cylinder 15 is cut off. The mask means 30 comprises an AND gate which has a positive or non-inverted input terminal connected to an output terminal of the second counter 13, and a negative or inverted input terminal connected to the controller 1 which generates, in this embodiment, a mask signal H in response to cut-off of the fuel supply to the cylinder 15, as shown at (H) in FIG. 4.

The construction of this embodiment other than the above is the same as that of the known apparatus of FIG. 5 and hence the same elements are identified by the same symbols as employed in FIG. 5.

Figure 4:
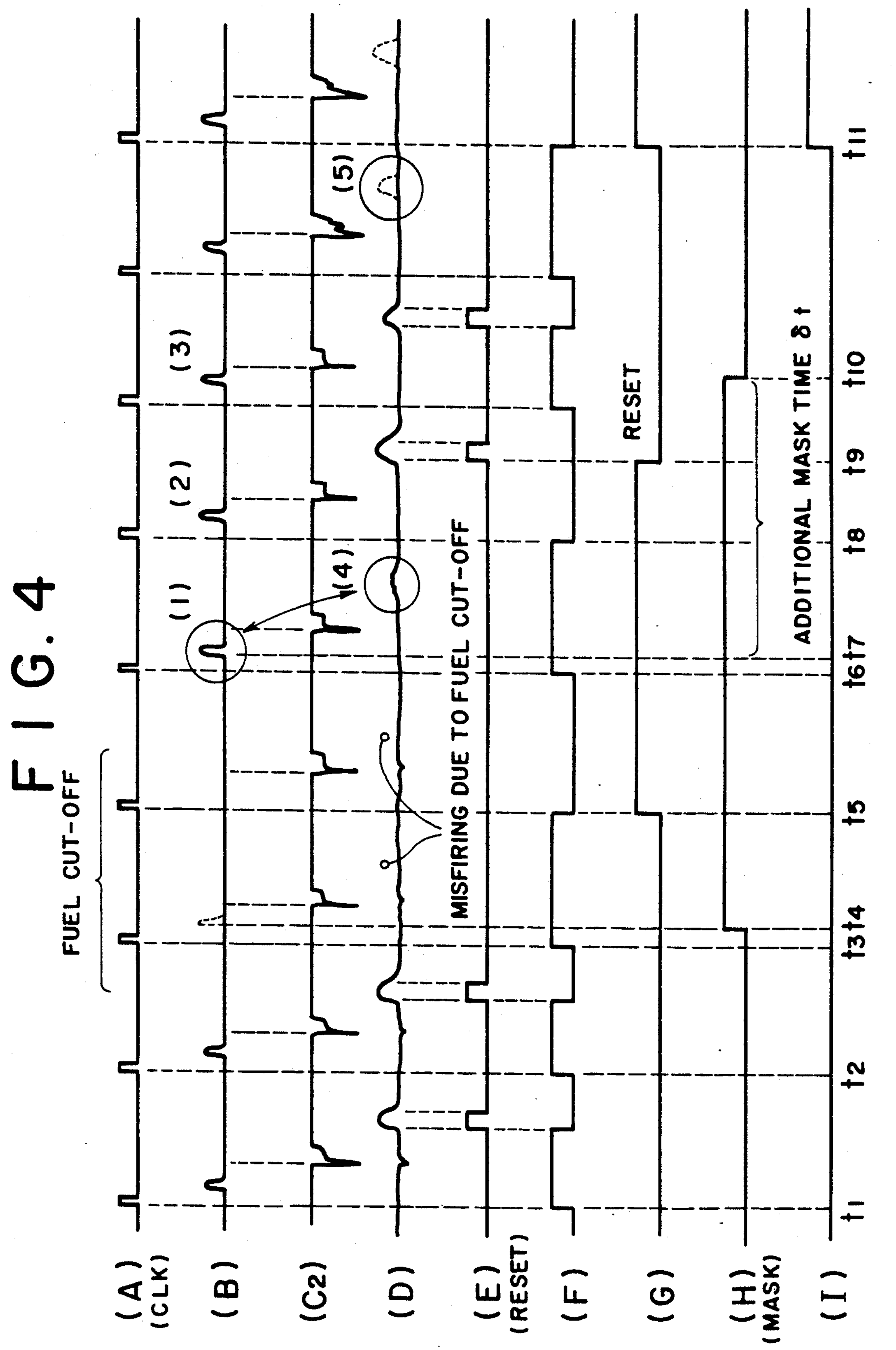
FIG. 4 is a view similar to FIG. 2, but with the embodiment of FIG. 3.

The operation of this embodiment will now be described in detail with particular reference to the timing chart of FIG. 4 in addition to FIG. 3. First, let us consider the case that the engine is normally operating without cutting off the fuel supply to the cylinder 15, as shown during the period between $t_1$ and $t_2$ in FIG. 4. In this case, the controller 1 supplies a fuel injection control signal B, as shown at (B) in FIG. 4, to a fuel injector 14 in synchronism with the output signal A from the signal generator 19, as shown at (A) in FIG. 4. At the same time, the controller 1 also controls a power transistor 2 such that the power transistor 2 is turned off at appropriate timing, generating a high negative voltage across the secondary winding of an ignition coil 3, as shown at ($C_2$) in FIG. 4. As a result, a spark plug 5 discharges to generates a spark whereby an air/fuel mixture in the cylinder 15 is fired to combust, generating an ion current in a gap between the electrodes of the spark plug 5. The ion current thus generated is supplied from the spark plug 5 through a diode 6 and a capacitor 9 to a first input terminal of a comparator 11, which then produces an output signal E, as shown at (E) in FIG. 4, which is input to a common reset terminal of the first and second counters 12, 13 as a reset signal. The first counter 12 generates an output signal F which is turned into a high level by a clock pulse A from a comparator 20 and then reset to a low level by a reset pulse E from the comparator 11, as shown at (F) in FIG. 4, so the second counter 13 generates a low level output signal G during the time from $t_1$ to $t_2$, as shown at (G) in FIG. 4. The other positive or nonexclusive input terminal of the AND gate 30 is at a low level, as shown at (H) in FIG. 4, so the output level thereof is also low, as shown at (I) in FIG. 4.

Subsequently, when the fuel supply to the cylinder 15 is cut off at a time between $t_3$ and $t_6$ for example, the controller 1 stops the generation of a fuel injection control signal, as shown at (B) in FIG. 4. As a result, there is no ion current generated, as shown at (D) in FIG. 4, and the comparator 11 produces no reset signal, as shown at (E) in FIG. 4. Accordingly, as illustrated at (F) in FIG. 4, the output of the first counter 12 is turned into a high level by a clock pulse A at time $t_3$ and then into a low level by a following clock pulse A at time $t_5$, whereby the output of the second counter 13 rises at time $t_5$ and then falls at time $t_9$ (i.e., turned into a low level by a reset pulse E from the comparator 11). This means that during periods between $t_5$ and $t_6$ and between $t_6$ and $t_7$, the counter 13 generates a misfiring detection signal which should not be produced for intentional or controlled misfiring due, for example, to fuel supply cut-off as well as for normal firing. In order to avoid this situation, according to this embodiment, the output signal G of the second counter 13 is fed to the noninverted input terminal of the AND gate 30, to the inverted input terminal of which the controller 1 generates a mask signal H which rises in response to missing of a fuel injection control pulse B which should be issued at time $t_4$ for normal fuel injection control, as shown at (H) in FIG. 4. The mask signal H thus fed to the AND gate 30 serves to mask or disable the misfiring detection signal. In this regard, it may be considered that normal combustion does not take place immediately after restarting of the fuel supply due to some reason such as an insufficient amount of fuel present in the cylinder 15, as shown by a fuel injection control pulse (1) at (B) in FIG. 4 as well as by misfiring (4) at (D) in FIG. 4. Therefore, the mask pulse H is extended a predetermined length of time δt, as shown at (H) in FIG. 4, so as to ensure that it continues until normal combustion restarts without fail. To this end, the controller 1 performs such control through software, for example, by disabling or cancelling the mask signal H when a predetermined number (three, in the illustrated embodiment) of fuel injection control pulses B are counted after restarting of the fuel supply, or by disabling or cancelling the mask signal H through timer control after a predetermined time is elapsed from the restarting of the fuel supply. In addition, a pulse (5), as shown by a dashed line at (D) in FIG. 4, indicates an occurrence of actual or true misfiring, and in this case, the output of the AND gate 30 rises at time $t_{11}$, as shown at (I) in FIG. 4, indicating that fact.

From the foregoing, it will be understood to those skilled in the art that the AND gate 30 of FIG. 3 can be incorporated in the apparatus of FIG. 1, or the mask means 25 comprising the elements 21 through 25 can instead be incorporated in the apparatus of FIG. 3, to provide combined functions performed by these apparatuses.

What is claimed is:

1. An ignition apparatus for an internal combustion engine having an ignition coil and a spark plug with electrodes, said apparatus comprising:

a controller for controling the ignition of a cylinder of said engine in synchronism with the rotation thereof;

a detector connected to said spark plug and said ignition coil for detecting an ion current which is generated between the electrodes of said spark plug upon combustion of an air/fuel mixture in said cylinder;

and mask means for masking the output signal of said detector in response to discharge of said spark plug.

2. An ignition apparatus according to claim 1, wherein said detector is an ion current detector which detects an ion current component generated by the combustion of the mixture due to the ion current and a noise component generated by said ignition coil upon ignition, said mask means being operable to mask the noise component alone contained in the output signal of said detector.

3. An ignition apparatus according to claim 2, wherein said mask means comprises:

a serial connection including a resistor and a capacitor serially connected to each other between said ignition coil and ground;

a comparator having a first input terminal connected to a node between said resistor and said capacitor, a second input terminal on which a reference voltage is imposed, and an output terminal; and an AND gate having an inverted input terminal connected to the output terminal of said comparator and a non-inverted input terminal to which the output signal of said detector is input.

4. An ignition apparatus according to claim 3, wherein said detector is an ion current detector which comprises:

a reverse-current checking diode having an anode connected to said spark plug and said ignition coil, and a cathode connected to a DC power source through a first resistor;

a serial connection comprising a capacitor and a second resistor and connected in parallel with a serial connection comprising said first resistor and said DC power source; and a comparator having a first input terminal connected to a junction between said capacitor and said second resistor, a second input terminal on which a reference voltage is imposed, and an output terminal connected to the non-inverted input terminal of said AND gate.

5. An ignition apparatus for an internal combustion engine comprising:

a controller for controlling the ignition of and the fuel supply to a cylinder of the engine in synchronism with the rotation thereof;

a detector for detecting misfiring in the cylinder; and mask means for masking the output signal of said detector when said controller cuts off the fuel supply to the cylinder.

6. An ignition apparatus according to claim 5, wherein said mask means comprises an AND gate having an inverted input terminal connected to receive a mask signal which is generated by said controller in response to cut-off of the fuel supply to said cylinder, the generation of the mask signal being stopped after the fuel supply to said cylinder restarts, and a non-inverted input terminal to which the output signal of said detector is input.

7. An ignition apparatus according to claim 6, wherein said detector is a misfiring detector which comprises:

an ion current detector for detecting an ion current which is generated between the electrodes of a spark plug upon combustion of an air/fuel mixture in said cylinder; and counter means having a clock terminal to which a clock signal is input, a reset terminal to which the output signal of said ion current detector is input, and an output terminal connected to the non-inverted input terminal of said AND gate.

8. An ignition apparatus according to claim 7, wherein said ion current detector comprises:

a reverse-current checking diode having an anode connected to said spark plug and said ignition coil, and a cathode connected to a DC power source through a first resistor;

a serial connection comprising a capacitor and a second resistor and connected in parallel with a serial connection comprising said first resistor and said DC power source; and a comparator having a first input terminal connected to a junction between said capacitor and said second resistor, a second input terminal on which a reference voltage is imposed, and an output terminal connected to the reset terminal of said counter means.

9. An ignition apparatus for an internal combustion engine having an ignition coil and a spark plug with electrodes, said apparatus comprising:

a controller for controlling the ignition of and the fuel supply to a cylinder of said engine in synchronism with the rotation thereof;

a misfiring detector for detecting misfiring in said cylinder, said misfiring detector including an ion current detector which is connected to said spark plug and said ignition coil for detecting an ion current which is generated between the electrodes of said spark plug upon combustion of an air/fuel mixture in said cylinder; and first mask means for masking the output signal of said ion current detector in response to discharge of said spark plug; and second mask means for masking the output signal of said misfiring detector when said controller cuts off the fuel supply to said cylinder.

10. An ignition apparatus according to claim 9, wherein said ion current detector detects an ion current component generated by the combustion of the mixture due to the ion current and a noise component generated by said ignition coil upon ignition, said first mask means being operable to mask the noise component alone contained in the output signal of said ion current detector.

11. An ignition apparatus according to claim 10, wherein said first mask means comprises:

a serial connection including a resistor and a capacitor serially connected to each other between said ignition coil and ground;

a comparator having a first input terminal connected to a node between said resistor and said capacitor, a second input terminal on which a reference voltage is imposed, and an output terminal; and an AND gate having an inverted input terminal connected to the output terminal of said comparator and a non-inverted input terminal to which the output signal of said detector is input.

12. An ignition apparatus according to claim 9, wherein said second mask means comprises an AND gate having an inverted input terminal connected to receive a mask signal which is generated by said controller in response to cut-off of the fuel supply to said cylinder, the generation of the mask signal being stopped after the fuel supply to said cylinder restarts, and a non-inverted input terminal to which the output signal of said misfiring detector is input.

13. An ignition apparatus according to claim 12, wherein said misfiring detector further includes counter means having a clock terminal to which a clock signal is input, a reset terminal to which the output signal of said ion current detector is input, and an output terminal connected to the non-inverted input terminal of said AND gate.

14. An ignition apparatus according to claim 12, wherein said ion current detector comprises:

a reverse-current checking diode having an anode connected to said spark plug and said ignition coil, and a cathode connected to a DC power source through a first resistor;

a serial connection comprising a capacitor and a second resistor and connected in parallel with a serial connection comprising said first resistor and said DC power source; and a comparator having a first input terminal connected to a junction between said capacitor and said second resistor, a second input terminal on which a reference voltage is imposed, and an output terminal connected to the reset terminal of said counter means.

* * * * *